United States Patent
Nishiura et al.

(10) Patent No.: US 10,047,664 B2
(45) Date of Patent: Aug. 14, 2018

(54) ENGINE (71) Applicant: Yanmar Co., Ltd., Osaka-shi (JP)

(72) Inventors: Fumihiro Nishiura, Osaka (JP); Takehiro Noda, Osaka (JP); Shunji Hamaoka, Osaka (JP); Fumiya Kotou, Osaka (JP); Yuuya Hanada, Osaka (JP)

(73) Assignee: YANMAR CO., LTD., Osaka-shi (JP)

( * ) Notice: Subject to any disclaimer, the term of this patent is extended or adjusted under 35 U.S.C. 154(b) by 297 days.

(21) Appl. No.: 14/897,576

(22) PCT Filed: May 26, 2014

(86) PCT No.: PCT/JP2014/063879
§ 371 (c)(1),
(2) Date: Dec. 10, 2015

(87) PCT Pub. No.: WO2014/199812
PCT Pub. Date: Dec. 18, 2014

(65) Prior Publication Data
US 2016/0138462 A1 May 19, 2016

(30) Foreign Application Priority Data

Jun. 11, 2013 (JP) ................... 2013-123108
Jun. 11, 2013 (JP) ................... 2013-123109

(51) Int. Cl.
*F02B 37/013* (2006.01)
*F02B 37/02* (2006.01)
(Continued)

(52) U.S. Cl.
CPC .......... *F02B 37/004* (2013.01); *F01N 13/107* (2013.01); *F02B 29/0412* (2013.01);
(Continued)

(58) Field of Classification Search
CPC .... F02B 37/004; F02B 37/013; F02B 37/025; F02B 29/0412; F01N 13/107; F02D 13/0269; F02D 13/0226
(Continued)

(56) References Cited

U.S. PATENT DOCUMENTS

2005/0247284 A1 11/2005 Weber et al.
2013/0199162 A1* 8/2013 Schlemmer-Kelling
.............................. F01N 3/106
60/278

FOREIGN PATENT DOCUMENTS

EP 2148061 A1 * 1/2010 .......... F02B 29/0412
EP 2 511 511 A1 10/2012
(Continued)

OTHER PUBLICATIONS

International Search Report for PCT/JP2014/063879 dated Aug. 5, 2014, 5 pages.
Caterpillar Motoren GmbH & Co. KG.

*Primary Examiner* — Mahmoud Gimie
(74) *Attorney, Agent, or Firm* — Norton Rose Fulbright US LLP (57) ABSTRACT

The object of the present invention is to provide a compact engine. An engine has a two-stage turbocharger provided with a high-pressure turbocharger and a low-pressure turbocharger. The high-pressure turbocharger and the low-pressure turbocharger are separately disposed on the gear case side and the flywheel side in along direction of a main body respectively. An intake pipe and an exhaust pipe connecting the high-pressure turbocharger with the low-pressure turbocharger are separately and respectively disposed on right side and left side in a transverse direction of the main body.

2 Claims, 6 Drawing Sheets

(51) Int. Cl.
  *F02B 37/00* (2006.01)
  *F02M 26/22* (2016.01)
  *F01N 13/10* (2010.01)
  *F02B 29/04* (2006.01)
  *F02D 13/02* (2006.01)

(52) U.S. Cl.
  CPC .......... *F02B 37/013* (2013.01); *F02B 37/025* (2013.01); *F02D 13/0226* (2013.01); *F02D 13/0269* (2013.01); *F02M 26/22* (2016.02); *Y02T 10/142* (2013.01); *Y02T 10/144* (2013.01); *Y02T 10/146* (2013.01)

(58) Field of Classification Search
  USPC .................................................. 123/562, 563
  See application file for complete search history.

(56) References Cited

FOREIGN PATENT DOCUMENTS

| | | |
|---|---|---|
| FR | 2922595 A1 | 4/2009 |
| JP | S60-101223 A | 6/1985 |
| JP | S60-120229 U | 8/1985 |
| JP | H06-066146 A | 3/1994 |
| JP | H08-28287 A | 1/1996 |
| JP | H11-350989 A | 12/1999 |
| JP | 2001-342839 A | 12/2001 |
| JP | 2002-284091 A | 10/2002 |
| JP | 2007-224864 A | 9/2007 |
| JP | 2012-092841 A | 5/2012 |
| WO | WO 2012-016712 A1 | 9/2012 |

\* cited by examiner

ENGINE

TECHNICAL FIELD

The present invention relates to an engine having a two-stage turbocharger provided with a high-pressure turbocharger and a low-pressure turbocharger.

BACKGROUND ART

Conventionally, there is known an engine having a two-stage turbocharger. In the engine having the two-stage turbocharger, it is common that the high-pressure turbocharger and the low-pressure turbocharger are disposed close to each other and the high-pressure turbocharger and the low-pressure turbocharger are connected by an intake pipe and an exhaust pipe. For example, JP 06-066146 A discloses an engine in which a high-pressure turbocharger and a low-pressure turbocharger are disposed on one side above a cylinder block.

However, in the engine in which the high-pressure turbocharger and the low-pressure turbocharger are disposed close to each other and the high-pressure turbocharger and the low-pressure turbocharger are connected by the intake pipe and the exhaust pipe, space is not utilized in a part (a side) where the high-pressure turbocharger and the low-pressure turbocharger are disposed, which can not make a configuration of the engine compact.

CITATION LIST

Patent Literature
  PTL1: JP 06-066146 A
  PTL2: JP 11-350989 A

SUMMARY OF INVENTION

Technical Problem

The object of the present invention is to provide a compact engine.

Solution to Problem

The present invention is an engine having a two-stage turbocharger provided with a high-pressure turbocharger and a low-pressure turbocharger. The high-pressure turbocharger and the low-pressure turbocharger are separately disposed on one side and the other side in along direction of a main body respectively.

Preferably, an intake pipe and an exhaust pipe connecting the high-pressure turbocharger with the low-pressure turbocharger are separately disposed on one side and the other side in a transvers direction of the main body respectively.

Preferably, an intercooler is disposed below the high-pressure turbocharger or the low-pressure turbocharger.

Advantageous Effects of Invention

In accordance with an engine according to the present invention, a compact configuration can be achieved.

DESCRIPTION OF EMBODIMENTS

Figure 1:
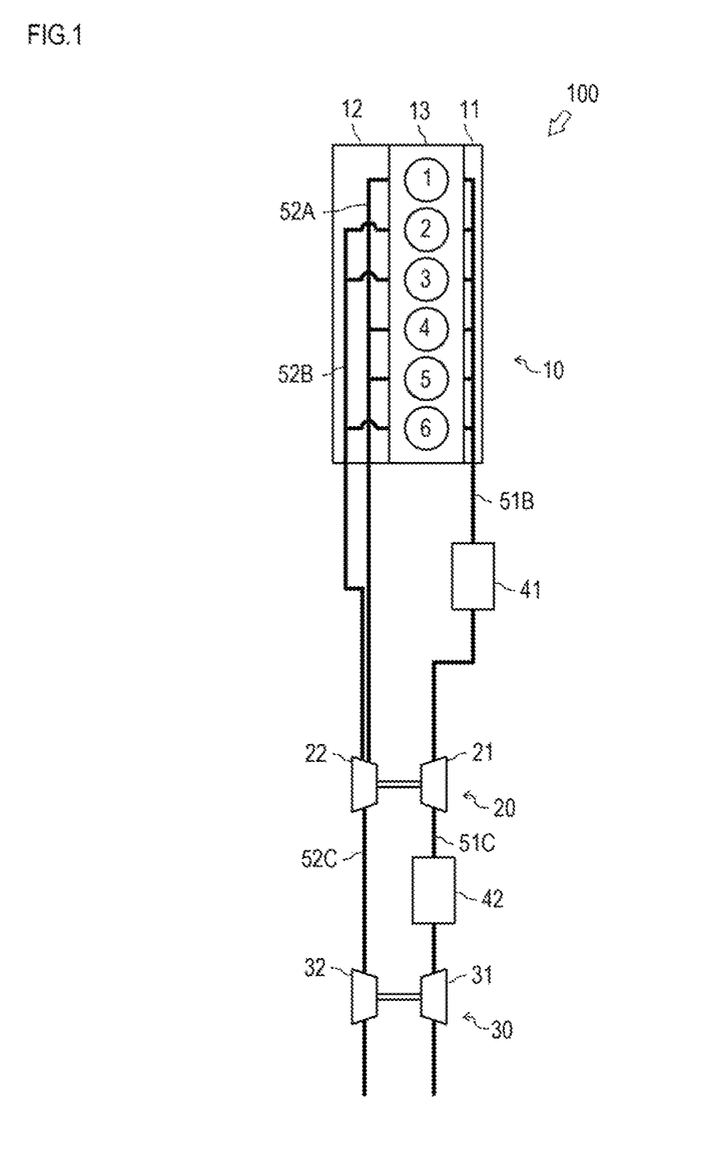
FIG. 1 is a schematic view showing a configuration of an engine.

A configuration of an engine 100 is explained using FIG. 1.

FIG. 1 schematically shows the configuration of the engine 100.

The engine 100 is an inline-six diesel engine with a Miller cycle, which has a two-stage turbocharger. The engine 100 includes an engine body 10 and the two-stage turbocharger. The engine 100 of the present embodiment is a marine engine and especially an engine for driving a propeller (a main engine). However, the present invention is not limited to the engine for driving the propeller.

The engine body 10 includes an intake manifold 11, an exhaust manifold 12, a cylinder block 13, and a cylinder head. The exhaust manifold 12 is of a dynamic pressure type. In the exhaust manifold 12, cylinders 1, 4 and 5 are collected and connected to an exhaust pipe 52A, and cylinders 2, 3 and 6 are collected and connected to an exhaust pipe 52B.

In the engine 100 of the present embodiment, the exhaust manifold 12 is of the dynamic pressure type such that the cylinders 1, 4 and 5 are collected and connected to the exhaust pipe 52A, and that the cylinders 2, 3 and 6 are collected and connected to the exhaust pipe 52B. However, the present invention is not limited thereto. For, example, the exhaust manifold 12 may be of the dynamic pressure type such that the cylinders 1, 2 and 3 are collected and connected to the exhaust pipe 52A, and that the cylinders 4, 5 and 6 are collected and connected to the exhaust pipe 52B.

The two-stage turbocharger includes a high-pressure turbocharger 20, a low-pressure turbocharger 30, a high-pressure intercooler 41 and a low-pressure intercooler 42. The high-pressure turbocharger 20 is disposed on the upstream side in an exhaust stream from the engine body 10. The high-pressure turbocharger 20 includes a high-pressure compressor 21 and a high-pressure turbine 22. The low-pressure turbocharger 30 is disposed on the downstream side in the exhaust stream from the engine body 10. The low-pressure turbocharger 30 includes a low-pressure compressor 31 and a low-pressure turbine 32.

The high-pressure intercooler 41 and the low-pressure intercooler 42 are disposed on an intake system of the two-stage turbocharger. The high-pressure intercooler 41 is disposed on the upstream side of the high-pressure turbocharger 20. The low-pressure intercooler 42 is disposed on the upstream side of the low-pressure turbocharger 30.

The intake manifold 11 and the high-pressure intercooler 41 are connected by an intake pipe 51B. The high-pressure compressor 21 and the low-pressure intercooler 42 are connected by an intake pipe 51C.

The exhaust manifold 12 and the high-pressure turbine 22 are connected by the exhaust pipe 52A and the exhaust pipe 52B. The high-pressure turbine 22 and the low-pressure turbine 32 are connected by an exhaust pipe 52C.

Figure 2:
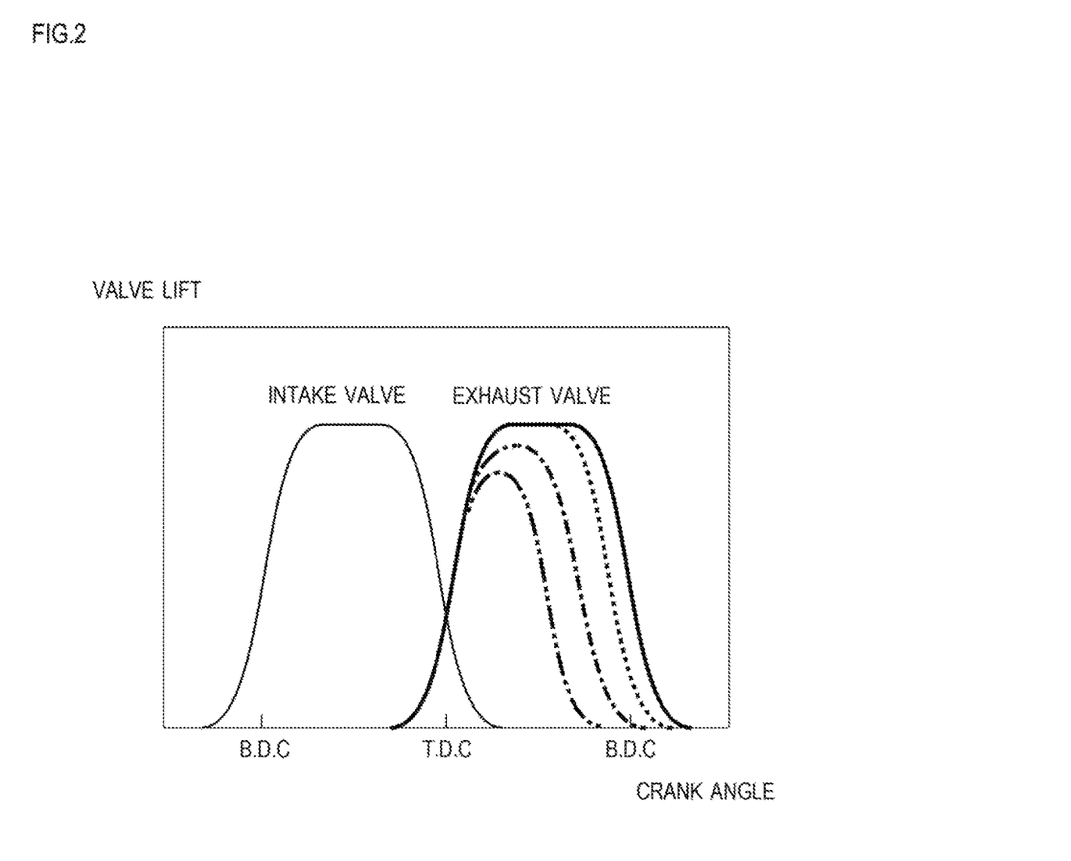
FIG. 2 is a graph showing a Miller cycle.

The Miller cycle is explained using FIG. 2.

In FIG. 2, the Miller cycle is illustrated by a correlation between a crank angle and a valve lift. In FIG. 2, a lift of an exhaust valve is illustrated on the left side of a paper surface and a lift of an intake valve is illustrated on the right side of the paper surface.

In the Miller cycle (the Miller cycle engine), the amount of intake air is controlled such that intake air is expanded depending on the downward movement of a piston by controlling close timing of the intake valve. In the Miller cycle of the present embodiment, the amount of intake air is reduced by closing the intake valve before a piston arrives at the bottom dead center.

For example, in the Miller cycle, in comparison with a standard valve lift of the intake valve, the close timing is advanced and the valve lift is reduced as a first example (a broken line in FIG. 2), a second example (a dashed-dot line in FIG. 2) and a third example (a dashed-two dotted line in FIG. 2). In the engine 100 of the present embodiment, the second example is adopted, the valve lift is reduced by approximately 25% of the standard valve lift, the close timing is advanced by approximately 45° from a standard close timing.

In the engine 100 of the present embodiment, the second example is adopted. Exhaust works may be improved by advancing close timing of the exhaust valve.

The configuration of the two-stage turbocharger is explained using in FIGS. 3 to 6.

Figure 3:
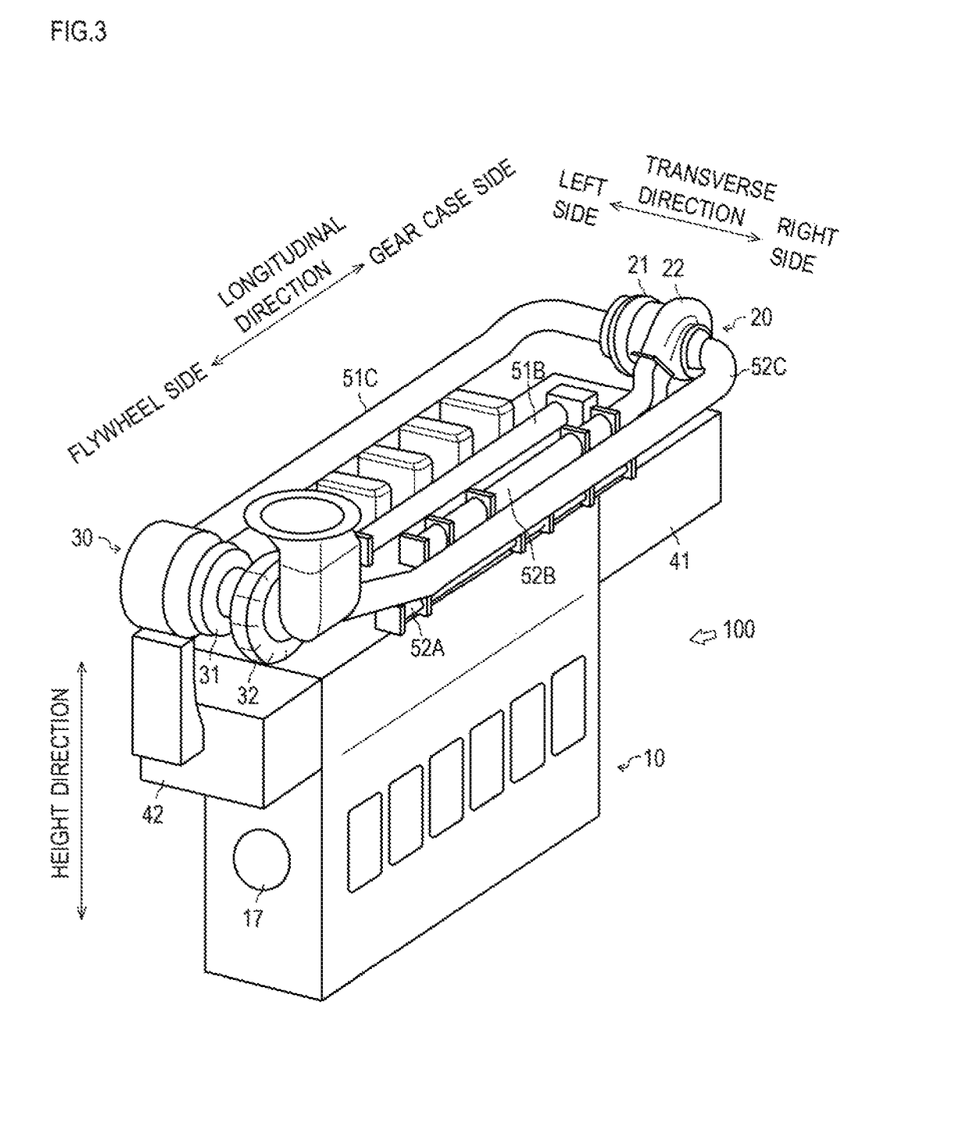
FIG. 3 is a perspective view showing the configuration of the engine.
Figure 4:
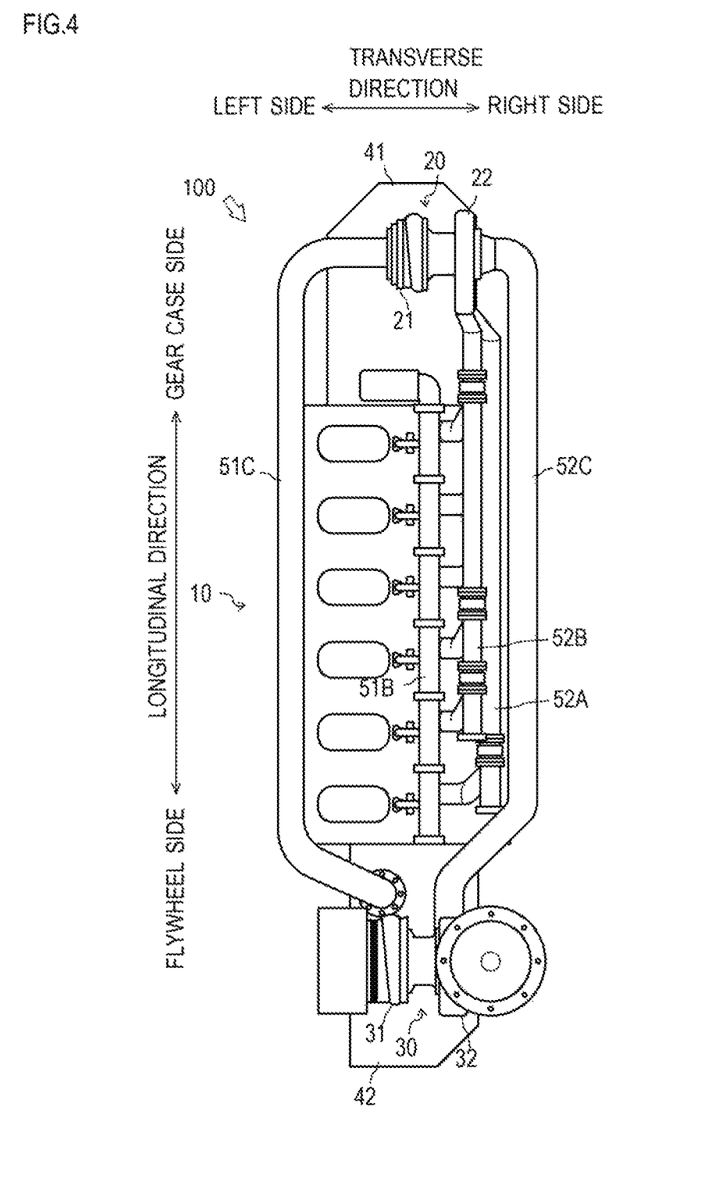
FIG. 4 is a plan view showing the configuration of the engine.
Figure 5:
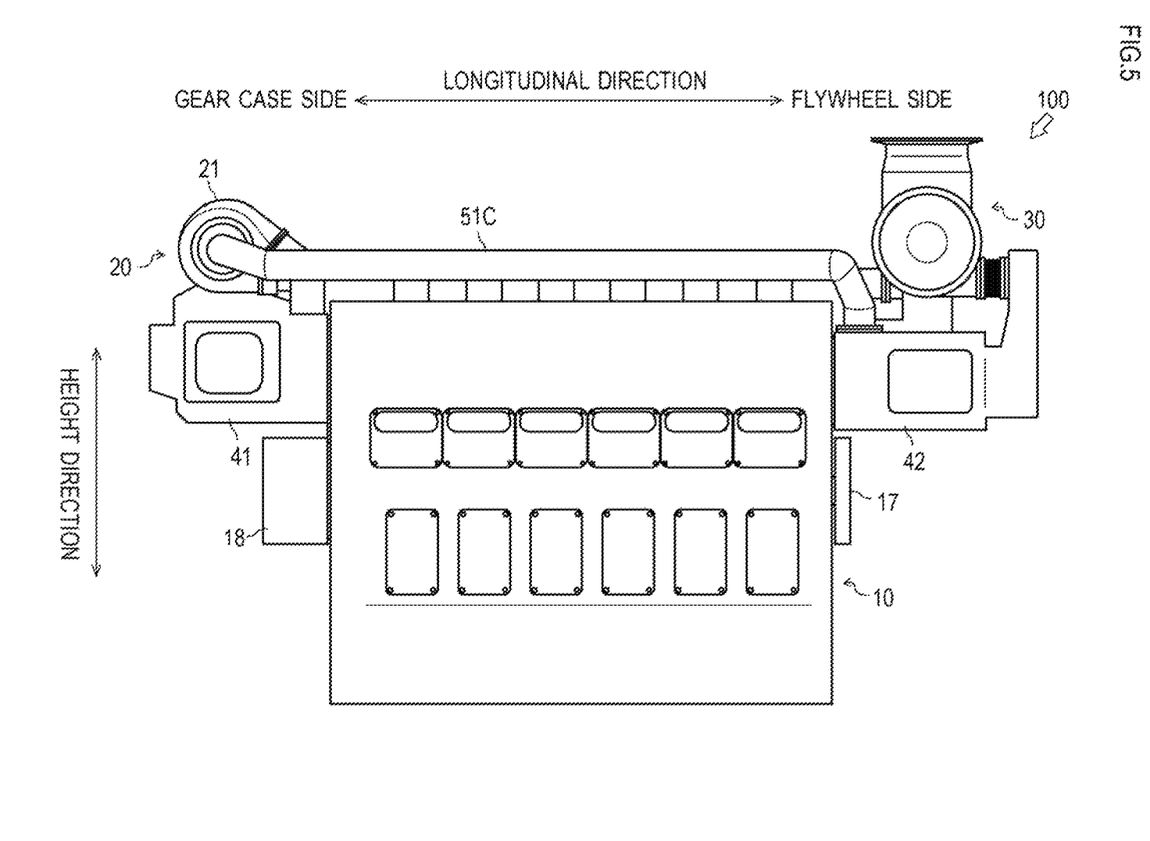
FIG. 5 is a left-side view showing the configuration of the engine.
Figure 6:
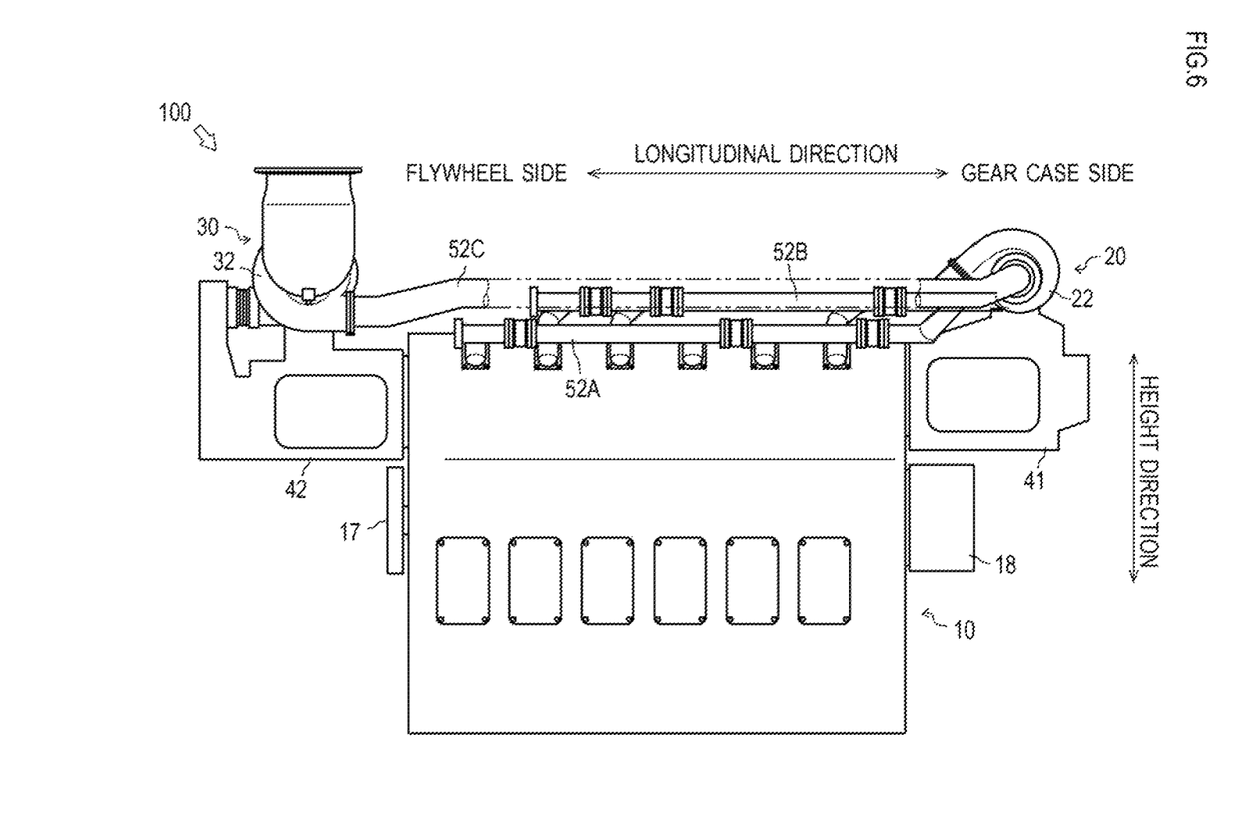
FIG. 6 is a right-side view showing the configuration of the engine.

FIG. 3 is a perspective view of the engine 100. FIG. 4 is a plan view of the engine 100. FIG. 5 is a left-side view of the engine 100. FIG. 6 is a right-side view of the engine 100.

Hereinafter, in an explanation, a longitudinal direction, a transvers direction and a height direction shown in FIGS. 3 to 6 are used. The longitudinal direction is defined as a direction from a flywheel 17 toward a gear case 18. A flywheel side is defined as a side in the longitudinal direction where the flywheel 17 exists, and a gear case side is defined as a side in the longitudinal direction where the gear case 18 exists. The transvers direction is defined as a direction orthogonal to the direction from the flywheel 17 toward the gear case 18 on the horizontal plane, and the right side and the left side are respectively defined from the flywheel 17 to the gear case 18.

As mentioned above, the two-stage turbocharger includes the engine body 10, the high-pressure turbocharger 20, the low-pressure turbocharger 30, the high-pressure intercooler 41 and the low-pressure intercooler 42. The high-pressure turbocharger 20, the low-pressure turbocharger 30, the high-pressure intercooler 41 and the low-pressure intercooler 42 are disposed around the engine body 10.

The high-pressure intercooler 41 is disposed next to the engine body 10 in the flywheel side of the longitudinal direction. The high-pressure intercooler 41 is disposed such that a top face of the high-pressure intercooler 41 is at substantially same position as the top face of the engine body 10 in the height direction.

The low-pressure intercooler 42 is disposed next to the engine body 10 in the flywheel side of the longitudinal direction. The low-pressure intercooler 42 is disposed such that a top face of the low-pressure intercooler 41 is at substantially position as the top face of the engine body 10 in the height direction. The low-pressure intercooler 42 is disposed in the substantially middle position in the transvers direction.

The high-pressure turbocharger 20 is disposed above the high-pressure intercooler 41. In other words, in the engine 100, the high-pressure turbocharger 20 is disposed on the flywheel side of the longitudinal direction, on the upper side of the height direction and in the substantially middle position in the transvers direction.

The low-pressure turbocharger 30 is disposed above the low-pressure intercooler 42. In other words, in the engine 100, the low-pressure turbocharger 30 is disposed on the flywheel side of the longitudinal direction, on the upper side of the height direction and in the substantially middle position in the transvers direction.

The high-pressure turbocharger 20 and the low-pressure turbocharger 30 are separately disposed on the gear case side and on the flywheel side respectively across the engine body 10.

As mentioned above, the intake pipe 51B connects the intake manifold 11 (see FIG. 1) with the high-pressure intercooler 41. The intake pipe 51B is disposed along the longitudinal direction of the engine body 10. The intake pipe 51B is disposed on the upper side of the height direction. The intake pipe 51B is disposed in the substantially middle position in the transvers direction.

As mentioned above, the intake pipe 51C connects the high-pressure compressor 21 with the low-pressure intercooler 42. The intake pipe 51C is disposed along the longitudinal direction of the engine body 10. The intake pipe 51C is disposed on the upper side of the height direction. The intake pipe 51C is disposed on the left side in the transvers direction of the engine 100. The intake pipe 51C is bent at right angle, forms a liner part, and is connected the high-pressure compressor 21.

For details, the intake pipe 51C is disposed along the left end side of the engine body 10 in the plan view. The intake pipe 51C and the exhaust pipe 52C, described below, are parallelly and separately disposed across the engine body 10.

As mentioned above, the exhaust pipe 52A connects the high-pressure turbine 22 with the exhaust manifold 12 (see FIG. 1) collecting the cylinders 1, 4 and 5. The exhaust pipe 52A is disposed along the longitudinal direction of the engine body 10. The exhaust pipe 52A is disposed on the upper side of the height direction. The exhaust pipe 52A is disposed in the substantially middle position in the transvers direction.

As mentioned above, the exhaust pipe 52B connects the high-pressure turbine 22 with the exhaust manifold 12 (see FIG. 1) collecting the cylinders 2, 3 and 6. The exhaust pipe 52A is disposed along the longitudinal direction of the engine body 10. The exhaust pipe 52A is disposed on the upper side of the height direction. The exhaust pipe 52A is disposed in the substantially middle position in the transvers direction.

Note that the exhaust pipe 52A and the exhaust pipe 52B are disposed in substantially parallel in the longitudinal direction. The exhaust pipe 52B is disposed above the exhaust pipe 52A.

In the engine 100 of the present embodiment, the exhaust pipe 52B is disposed above the exhaust pipe 52A. However, the present invention is not limited thereto. For example, the exhaust pipe 52A may be disposed above the exhaust pipe 52B.

As mentioned above, the exhaust pipe 52C connects the high-pressure turbine 22 with the low-pressure turbine 32. The exhaust pipe 52C is disposed along the longitudinal direction of the engine body 10. The exhaust pipe 52C is disposed on the upper side of the height direction. The exhaust pipe 52C is disposed on the right side in the transvers direction of the engine 100. The exhaust pipe 52C is bent to the right at approximately 45° in plan view, additionally to the left at approximately 45°, and is smoothly connected to the low-pressure turbine 32.

For details, the exhaust pipe 52C is disposed along the right end side of the engine body 10 in the plan view. The exhaust pipe 52C and the above-mentioned intake pipe 51C are parallelly and separately disposed.

Note that the exhaust pipe 52C is disposed on the outer side of the exhaust pipe 52A and the exhaust pipe 52B (on the right side of the transvers direction) relative to the engine body 10 in the plan view. In other words, the exhaust pipe 52A and the exhaust pipe 52B are disposed on the inner side of the exhaust pipe 52C (on the left side of the transvers direction) relative to the engine body 10 in the plan view.

Effect of the engine 100 is explained.

In accordance with the engine 100, NOx can be reduced by closing the intake valve before the piston arrives at the bottom dead center, and the compact configuration can be achieved.

Conventionally, in the engine with the Miller cycle closing the intake valve before the piston arrives at the bottom dead center or closing the intake valve effectively, it is considered to be provided with a variable valve mechanism, a waste gate valve or the like in order to solve a problem that the amount of the intake air have to be increased in a low-load area or a low-speed area, which makes the configuration of the engine complicated.

In the engine 100, the NOx is reduced by closing the intake valve before the piston arrives at the bottom dead center. In the two-stage turbocharger having the high-pressure turbocharger 20 and the low-pressure turbocharger 30, the exhaust manifold 12 is of the dynamic pressure type, so that the compact configuration can be achieved.

In accordance with the engine 100, the exhaust pipe 52A and the exhaust pipe 52B are parallelly disposed on the height direction, so that a space for disposing the exhaust pipe can be compact.

Furthermore, in accordance with the engine 100, the space for disposing the exhaust pipe can be compact by the exhaust pipe 52A and the exhaust pipe 52B disposed on the inside of the exhaust pipe 52C, in the plan view, having the diameter larger than that of the exhaust pipe 52A and the exhaust pipe 52B. For example, the exhaust pipe 52C is configured such that the diameter of the exhaust pipe 52C is larger than 10% of the sum of that of the exhaust pipe 52A and that of the exhaust pipe 52B.

Furthermore, the effect of the engine 100 is explained.

In accordance with the engine 100, the compact configuration can be achieved.

Conventionally, in the engine in which the high-pressure turbocharger and the low-pressure turbocharger are disposed close to each other and the high-pressure turbocharger and the low-pressure turbocharger are connected by the intake pipe and the exhaust pipe, space is not utilized in a part (a side) where the high-pressure turbocharger and the low-pressure turbocharger are disposed, which can not make the configuration compact.

In accordance with the engine 100, the high-pressure turbocharger 20 and the low-pressure turbocharger 30 are separately disposed on the gear case side and the flywheel side respectively, which makes the configuration compact. Therefore, maintenance workability of the high-pressure turbocharger 20 or the low-pressure turbocharger 30 is improved.

In accordance with the engine 100, the intake pipe 51C and the exhaust pipe 52C are parallelly and separately disposed on the right side and the left side, which makes the configuration compact.

In accordance with the engine 100, the high-pressure turbocharger 20 is disposed above the high-pressure intercooler 41, and the low-pressure turbocharger 30 is disposed above the low-pressure intercooler 42, which makes the configuration compact.

INDUSTRIAL APPLICABILITY

The present invention is applicable to an engine.

REFERENCE SIGNS LIST

10: main body
11: intake manifold
12: exhaust manifold
20: high-pressure compressor
30: low-pressure compressor
41: high-pressure intercooler
42: low-pressure intercooler
51B: intake pipe
51C: intake pipe
52A: exhaust pipe
52B: exhaust pipe
52C: exhaust pipe
100: engine

What is claimed is:
1. An engine comprising:
a two-stage turbocharger provided with a high-pressure turbocharger and a low-pressure turbocharger,
wherein the high-pressure turbocharger and the low-pressure turbocharger are separately disposed on one side and the other side in along direction of a main body respectively; and
an intake pipe and an exhaust pipe connecting the high-pressure turbocharger with the low-pressure turbocharger, wherein the intake pipe and the exhaust pipe are separately disposed on one side and the other side of the engine in a transverse direction of the main body respectively, and wherein the low-pressure turbocharger is disposed downstream of the high pressure turbocharger in an exhaust stream of the exhaust pipe.
2. The engine according to claim 1, wherein
an intercooler is disposed below the high-pressure turbocharger or the low-pressure turbocharger.

* * * * *